United States Patent
Butler et al.

(10) Patent No.: US 9,994,719 B2
(45) Date of Patent: Jun. 12, 2018

(54) INTUMESCENT COATING COMPOSITION

(71) Applicant: AKZO NOBEL COATINGS INTERNATIONAL B.V., Arnhem (NL)

(72) Inventors: Rachel Butler, Tyne and Wear (GB); Kevin Jeffrey Kittle, Durham (GB); Thomas William Hope, Tyne and Wear (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 180 days.

(21) Appl. No.: 14/903,930

(22) PCT Filed: Jul. 11, 2014

(86) PCT No.: PCT/EP2014/064893
§ 371 (c)(1),
(2) Date: Jan. 8, 2016

(87) PCT Pub. No.: WO2015/007629
PCT Pub. Date: Jan. 22, 2015

(65) Prior Publication Data
US 2016/0152841 A1    Jun. 2, 2016

(30) Foreign Application Priority Data

Jul. 16, 2013 (EP) ..................... 13176656

(51) Int. Cl.
*C09D 5/18* (2006.01)
*B05D 3/00* (2006.01)
*C09D 163/00* (2006.01)
*B05D 3/10* (2006.01)

(52) U.S. Cl.
CPC ............ *C09D 5/185* (2013.01); *C09D 163/00* (2013.01); *B05D 3/108* (2013.01)

(58) Field of Classification Search
CPC .................................................. C09D 5/185
See application file for complete search history.

(56) References Cited

U.S. PATENT DOCUMENTS

| | | | |
|---|---|---|---|
| 3,755,223 A * | 8/1973 | Engel | ...... C08L 63/00 244/1 R |
| 3,934,066 A | 1/1976 | Murch | |
| 4,317,889 A | 3/1982 | Pcolinsky, Jr. | |
| 4,529,467 A | 7/1985 | Ward et al. | |
| 4,725,457 A | 2/1988 | Ward et al. | |
| 5,070,119 A | 12/1991 | Nugent, Jr. et al. | |
| 6,096,812 A * | 8/2000 | Hanafin | .......... C08K 3/36 428/413 |
| 7,217,753 B2 | 5/2007 | Sinclair et al. | |
| 8,372,899 B2 | 2/2013 | Kotzev et al. | |
| 2006/0041042 A1 | 2/2006 | Thewes et al. | |
| 2014/0005298 A1 | 1/2014 | Thewes | |

FOREIGN PATENT DOCUMENTS

| | | |
|---|---|---|
| CN | 1876740 A | 12/2006 |
| CN | 102153936 A | 8/2011 |
| CN | 102993905 A | 3/2013 |
| EP | 0 142 074 A2 | 5/1985 |
| EP | 0568354 A1 | 11/1993 |
| GB | 2 269 548 A | 2/1994 |
| JP | 60-110783 A | 6/1985 |
| JP | 2006-057091 A | 3/2006 |
| WO | 1996/03854 A2 | 2/1996 |
| WO | 1998/012270 A1 | 3/1998 |
| WO | 2010054984 A1 | 5/2010 |

OTHER PUBLICATIONS

EPON 828 resins MSDS, Nov. 1999 (Year: 1999).*
DER 732 Product Information, downloaded from Dow Oct. 2017 (Year: 2017).*
Overview of materials for Silicone Rubber, downloaded from matweb Oct. 2017 (Year: 2017).*
Silica fiber MSDS, downloaded from newtex Oct. 2017 (Year: 2017).*
Ammonium biborate tetrahydrate MSDS, ScienceLab, May 2013 (Year: 2013).*
Diammonium Phosphate, UnitedSuppliers, Aug. 2003 (Year: 2003).*

* cited by examiner

*Primary Examiner* — Ramsey E Zacharia
(74) *Attorney, Agent, or Firm* — McDonnell Boehnen Hulbert & Berghoff LLP

(57) ABSTRACT

A liquid intumescent coating composition comprising the following components: (a) 25.0-75.0 volume % of one or more organic thermosetting polymer(s) and one or more curing agent(s) for the organic thermosetting polymer(s), (b) 1.0-70.0 volume % of a source of phosphoric or sulphonic acid, (c) 6.0-60.0 volume % of a source of boric acid, (d) 0-2.0 volume % of melamine or melamine derivatives, (e) 0-1.0 volume % of one or more isocyanurate derivatives, wherein the volume % of components (a), (b), (c), (d) and (e) is calculated on the total volume of the non volatile components in the coating composition. The thermosetting intumescent coating composition is suitable for protecting substrates against hydrocarbon fires, for example jet fires. The coating composition can be used without a supporting mesh. The present invention also relates to substrates coated the intumescent coating composition, and a method of protecting structures from fire.

19 Claims, No Drawings

INTUMESCENT COATING COMPOSITION

REFERENCE TO RELATED APPLICATIONS

This application is the U.S. National Phase of PCT/EP2014/064893, filed on Jul. 11, 2014, which is incorporated herein by reference it its entirety, and which claims the benefit of EP Application No. 13176656.0, filed on Jul. 16, 2013.

The present invention relates to a liquid intumescent composition, substrates coated with said composition and a method protecting structures from fire. The char formed from a coating of the present invention has excellent strength and thermal insulation properties. Consequently, the intumescent coating composition has utility in protecting structures, such as offshore installations, against a turbulent hydrocarbon fire The use of steel framework as a method of building construction is commonplace. Much of the world's steel production goes into building construction. Steel framed buildings offer many advantages over traditional methods of construction but suffer a major disadvantage, namely that in the event of fire the temperature of unprotected steel quickly increases to a point where the steel "softens", loses its rigidity and this compromises the integrity of the structure. With time, the building will collapse but long before this happens the flexing of the structure will cause paneling, cladding etc, that may be connected to the steel framework, to break loose posing a significant hazard to people trying to evacuate the building and to fire fighters trying to contain the fire.

The simplest way to try to overcome the above mentioned disadvantage of a steel framework is in some way to insulate the steel. The degree of insulation affects the time taken to reach the point when the structure becomes unstable and various ratings are arrived at using official tests.

Intumescent coatings are used on many structures to delay the heating effects of a fire. The coating slows the rate of temperature increase of the substrate to which the coating is applied. The coating thus increases the time before the structure fails due to the heat of fire. The extra time makes it more likely that fire fighters will be able to extinguish the fire or at least apply cooling water before the structure fails.

To intumescent means to swell and to char. When exposed to heat/fire, an intumescent coating forms a thick, porous highly insulative (non-flammable) solid foam barrier on the surface that it covers.

The major benefit of these intumescent materials over the various other options available is that under normal conditions they take up virtually no space (typical coating thicknesses are in the region of 5 mm) and they add negligible additional weight to the structure. Intumescent coatings have been available commercially for many years. The majority of intumescent coatings require a primer coat, one of more layers of intumescent material in order to build up the required thickness of material, and a finishing coat to improve weatherability. There is a need for intumescent coatings which produce harder coatings, in less layers, and which are less easily damaged.

Conventional intumescent coatings comprising a polymeric binder typically also comprise the following components which enable the coating to intumescent upon exposure to heat/fire: a source of acid, a charring agent and a blowing agent.

When the conventional intumescent coating is exposed to fire or excessive heat, the source of acid decomposes to provide an acid. The charring or char forming agent (also known as a carbonific) reacts with the acid to form a carbonaceous char. Examples of char forming agents include, for example, polyhydric alcohols such as pentaerythritol or dipentaerythritol or mixtures thereof. The carbonaceous char is obtained on decomposition of the polyhydric alcohol. The blowing agent produces a nonflammable gas (usually ammonia) when subjected to heat or flame. The most commonly used blowing agents are melamine and melamine derivatives. THEIC which is tris-(2-Hydroxyethyl) isocyanurate, is also a known blowing agent. The gas evolved from the blowing agent serves to make the carbonaceous char expand to form a foam.

Intumescent coatings should be distinguished from fire retardant coatings. The purpose of a fire retardant or a flame retardant coating is to reduce the flammability and delay the combustion of the substrate which it coats. It is not necessary or essential for a pure fire retardant to intumesce. Consequently, fire retardant coatings often have a very different composition to traditional intumescent coatings. For example, fire retardant coatings sometimes contain high amounts of materials (certain fillers and pigments) which are for preventing the passage of flames, but these materials also inhibit the coating from intumescing.

Intumescent coatings may be categorized according to the type of fire they are designed to provide protection against. For example, some intumescent coatings are designed to provide protection against cellulosic fires, others are designed to provide protection against hydrocarbon fires.

By cellulosic fire protection, we mean coatings that are formulated to protect elements of structure from a cellulosic fire exposure. A cellulosic fire is one characterised by a fuel source such as wood, paper, textiles, etc. These fuels are typical of modern day commercial and infrastructure projects in the Built Environment, usually for architectural applications in the Built Environment including internal and externally exposed structural steelwork. The cellulosic standard fire test curve reaches 500° within about 5 minutes and rises to in excess of 1100° C. [2012° F.] over time.

By hydrocarbon fire protection we mean coatings that have been specifically formulated to protect steel structural elements from hydrocarbon fire exposure. Hydrocarbon fires, or pool fires, are fires that burn above a pool of vaporizing hydrocarbon fuel. Hydrocarbon fires have been found to be extremely turbulent and have a very rapid heat rise to about 1000° C. within 5 minutes, with a rise to 1100° C. shortly thereafter. A pool fire can compromise the structural integrity of typical steel work used in oil and gas facilities in a matter of minutes. Jet fires are a particular group of hydrocarbon fuelled fires resulting from the combustion of fuel that is continuously released under high pressure (2 bar or greater). Jet fires represent a significant risk for offshore installations due to the high heat fluxes and erosive forces that they produce.

Intumescent coatings that protect against hydrocarbon fire must be stronger, more hardwearing, have better weather resistance than intumescent coatings that protect against cellulosic fires. Further, intumescent coatings that protect against hydrocarbon fire must be capable of forming a very strong char with good structural integrity and adhesion to the substrate so that it does not fall apart or away from the substrate when exposed to the high heat fluxes and extreme erosive forces of a hydrocarbon fire.

In some instances, if an intumescent coating produces char foam with inadequate strength (against the turbulent forces of a hydrocarbon fire), various additives such as fillers, fibres, silica, glass reinforcing materials might be added to the intumescent coating composition with the aim of increasing the strength of the char. However, the use of a too high an amount of additives in conventional intumescent coating compositions reduces the amount the coating swells when exposed to excessive heat/fire, resulting in a compromise in it's thermal protection.

In other instances, if an intumescent coating produces a char foam with inadequate thermal insulation, further blowing agent, for example an amine-functional blowing agent such as urea, dicyandiamide, melamine and melamine derivatives is added. The purpose of adding extra blowing agent is to increase the amount of gas that is produced during the intumescent process so that a more expanded, lower density and higher insulating foam is formed. Usually however, a highly expanded foam has poor strength and adhesion.

To summarize the above, (i) intumescent coatings producing good strong and compact chars which are robust enough to resist the extreme erosive forces of a hydrocarbon fire, often have a poor ability to thermally insulate the substrate which they coat, and (ii) intumescent coatings which produce highly expanded chars with good thermal protection, the chars are not strong enough to resist the extreme erosive forces of a hydrocarbon fire.

A known solution to providing a coating system which provides strength, adhesion and good thermal insulation is to provide a coating system comprising two coating layers as described in WO96/03854. The coating system of WO96/03854 comprises a first coating layer which forms a rigid carbonific char foam having a toughness and density, and the second coating layer forms an insulative carbonific char foam having a density about half the density of the char foam of the first coating layer. The first layer is to protect the substrate from break-through and direct exposure to the fire conditions (i.e. strength) and the second layer is to provide insulation. WO96/03854 however fails to teach how to provide both strength and insulation using a single coating composition.

There is a need for an (i.e. one) intumescent coating composition that results in a coating which when exposed to heat produces a char having both excellent strength and providing excellent thermal protection, so that it is suitable for use in turbulent hydrocarbon fires.

There is a need for an (one) intumescent coating composition that results in a coating which when exposed to heat produces a char having both excellent strength and providing excellent thermal protection, to the extent that it is suitable for use in turbulent hydrocarbon fires.

Provided herein is an intumescent coating composition, which when cured and then exposed to heat, intumesces to form a non-flammable barrier which is both strong and has good fire performance (thermal insulation properties) to the extent that it is suitable for protecting against hydrocarbon fires.

The coating composition of the present invention provides a durable strong, hardwearing, and weather (water/corrosion) resistant film with good adhesion. When exposed to heat, a coating formed from the composition of the invention produces a coating having enough strength to the extent that reinforcing materials, such as a mesh, are not also required.

A further advantage is that the coating composition is easy to apply and when cured has good adhesion to the substrate to the extent that it is capable of being used without a reinforcing mesh. Since the coating can be applied and used without a mesh, the coating composition can be applied more quickly.

The liquid coating composition of the present invention advantageously can be applied by conventional methods such as brushing, pouring, airless spray or by troweling.

When the intumescent coating of the present invention is exposed to heat, gases are produced from a reaction between the source of phosphoric acid or sulphonic acid, the source of boric acid and the cured organic polymer(s).

These gases act as a blowing agent to foam the carbonaceous char. Surprisingly, the inventors have found that when the most commonly used blowing agents, including melamine, melamine derivatives and isocyanurate derivatives, are added to the coating composition of the present invention, there is a reduction or no improvement in thermal protection provided by the char, and there is a detrimental effect on char strength and char adhesion to the substrate. The reduction in char strength and char adhesion results in the char detaching from the substrate and cracking which further reduces the thermal protection afforded by the char. The inventors found therefore that it is necessary for the composition to comprise as little of these types of components as possible, and preferably none of these components.

Adding additives such as fillers, fibres, glass reinforcing materials to a coating composition might be expected to improve the strength of the char, but at the same time would be expected to reduce the amount the coating intumesces and compromise the thermal protection of the char. Surprisingly when glass fibres are added to the coating composition of the invention this compromise is not seen; in contrast, the char has both excellent thermal protection and strength.

The excellent properties of the coating composition of the present invention are due to specific combination and amounts of components defined herein. The liquid intumescent coating composition of the present invention comprises the following components:
  (a) 25.0-75.0 volume % of one or more organic thermosetting polymer(s) and one or more curing agent(s) for the organic thermosetting polymer(s),
  (b) 1.0-70.0 volume % of a source of phosphoric or sulphonic acid,
  (c) 6.0-60.0 volume % of a source of boric acid,
  (d) 0-2.0 volume % of melamine or melamine derivatives,
  (e) 0-1.0 volume % of one or more isocyanurate derivatives,
  wherein volume % is calculated on the total volume of the non volatile components in the coating composition.

Unless otherwise stated herein, all volume % (vol %) values stated herein are calculated on the total volume of the non volatile components in the coating composition at room temperature (25° C.). The volume of each component may be calculated with knowledge of the mass and specific density of the component.

The non volatile components in the coating composition are the components that are present in the coating after the coating composition has cured. For the purpose of this invention, as a general rule, non volatile components have a boiling point of more than 150° C. at 1 atmospheric pressure. A solvent in the coating composition, which is not present in the coating film, is not a non-volatile component.

By exposure to heat, preferably we mean exposure to temperatures of around 150° C. and higher (e.g. 250° C.), typically in a fire.

Preferably, the organic thermosetting polymers do not comprise a polysiloxane.

For example, the intumescent coating composition may comprise 35.0-65.0 volume % of (a), preferably 50.0-65.0 volume % of (a).

For example, the intumescent coating composition may comprise 1.0-50.0 volume of (b), preferably 5.0-25.0 volume % of (b).

For example, the intumescent coating composition may comprise 6.0-50.0 volume of (c), preferably 10.0-50.0 volume %, more preferably 10.0-25.0 volume % of (c).

In particular, the intumescent coating composition may comprise a total of 0-2.0 volume % of said melamine or melamine derivatives (d) and other amine functional blowing agents selected from dicyandiamide, urea and derivatives thereof (f).

The organic thermosetting polymer of (a) may comprise at least one of the following functional groups: epoxy, amine, ester, vinyl, vinyl ester, amide, urethane, mercaptan, carboxylic acid, acryloyl, methacryloyl, isocyanate, alkoxysilyl, anhydride, hydroxyl, alkoxy and polythiol groups.

An example of an organic thermosetting polymer of (a) is an epoxy resin. An example of the curing agent of (a) is selected from an amine, thiol, carboxylic acid, anhydride and/or alcohol functional curing agent. Preferably the organic thermosetting polymer of (a) is an epoxy resin and the curing agent of (a) is selected from an amine, thiol, carboxylic acid, anhydride and/or alcohol functional curing agent.

Component (c) may preferably be selected from one or more of the following: boric acid; borate salts such as ammonium pentaborate, zinc borate, sodium borate, lithium borate, aluminium borate, magnesium borate and; borosilicates. Most preferably (c) is ammonium pentaborate or boric acid.

Boric acid is known to have a blowing function. For example, U.S. Pat. No. 3,934,066 and WO 2010/054984 both mention that boric acid can be used as a blowing agent. Many other blowing agents, including melamine and urea, are also mentioned and are exemplified in U.S. Pat. No. 3,934,066 and WO 2010/054984. However both disclosures fail to suggest an intumescent coating composition formulated with at least 6.0 vol % of boric acid in combination with the other claimed components, and a very low amount of other specific blowing agents including melamine, and that the coating from this coating composition, would have excellent strength and provide excellent thermal protection to the extent that it is suitable for protection against hydrocarbon fires, even without a mesh.

Optionally, the intumescent coating composition may comprise a total of 0-2.0 volume % of said melamine or melamine derivatives (d), said other amine functional blowing agents selected from dicyandiamide, urea and derivatives thereof (f) and other blowing agents (g) wherein said other blowing agents (g) are selected from expandable graphite, sulfamic acid and tunastanate salts (such as sodium tungstanate), and derivatives thereof.

Optionally, the intumescent coating composition may comprise glass fibres.

The coating composition may optionally also comprise one or more source(s) of metal and/or metalloid ions. For example, the one or more source(s) of metal and/or metalloid ions may be present in an amount of 5-60 volume %. Examples of the one or more source(s) of metal or metalloid ions (c) that may be selected are one or more of the following: metal oxides, metalloid oxides, metal hydroxides, metalloid hydroxides, metal carbonates, metalloid carbonates, metal bicarbonates, metal phosphates, metal chlorides, metal sulphates, metal nitrates, metal silicates, and metal borates, and complexes thereof.

The metal in the source of metal or metalloid ions may be selected from Al, Si, Ti, Al, B, Zn, Cu, Mg, Na or Ca. The one or more source(s) of metal or metalloid ion(s) may be one or more of $TiO_2$, ZnO, $ZnPO_4$, $Al(OH)_3$, $Al_2O_3$, $AlPO_4$, Kaolin, MgO, $MgPO_4$ or $ZrO_2$.

In a specific case therefore, (a) may comprise an epoxy binder and an amine functional curing agent, (b) may be a source of phosphoric acid, and (c) may be one or more of the following: $TiO_2$, ZnO, $ZnPO_4$, $Al(OH)_3$, $Al_2O_3$, $AlPO_4$, Kaolin, MgO, $MgPO_4$, or $ZrO_2$.

Also within the scope of the present invention is a substrate coated with the coating compositions as described herein. Examples of substrates include, metal substrates, for example, steel and aluminium substrates, and composite materials, for example glass reinforced plastic (GRP) Since one advantage of this coating composition is that it coatings produced therefrom have remarkable strength to the extent that they do not crack or delaminate from the substrate when no reinforcing mesh is used even in the event of a turbulent hydrocarbon fire, another embodiment of the present invention is a substrate coated with the coating compositions as described herein wherein the coated substrate does not comprise a reinforcing mesh.

Also within the scope of the present invention is a method of protecting structures (such as offshore installations, oil and gas installations, onshore installations such as refineries and chemical installations and high value infrastructure buildings (HVI) from fire, by:

coating the structure with an intumescent coating composition as defined herein (for example, by brushing, pouring, spraying or troweling), optionally without a mesh, and allowing the coating composition to cure, preferably at ambient temperature (e.g. −5 to 50° C.).

The coating composition applied in the method is a liquid. Organic Thermosetting Polymer(s) and Curing Agent(s) (a)

The coating composition of the present invention comprises one or more organic thermosetting polymer(s) and curing agent(s) for the organic thermosetting polymer(s). Preferably the organic thermosetting polymer(s) do not comprise a polysiloxane chain. The organic thermosetting polymer and curing agent are capable of curing to form a coating on a substrate.

A polysiloxane chain is defined as a structure having a Si—O backbone with organic side groups attached to silicon atoms through a carbon or heteroatom linkage, wherein at least part of the silicon atoms is attached to one, two, or three oxygen atoms. A polysiloxane chain may have linear, branched, ladder and/or caged structure. A polysiloxane chain also includes precursors for said polysiloxane chain.

The organic thermosetting polymer preferably is therefore not an organopolysiloxane for example, a polysiloxane with organic pendent groups, for example, $C_1$-$C_{10}$ alkyl (methyl, ethyl, phenyl), amino and epoxy groups.

The organic thermosetting polymer has an organic nature. By organic nature, we mean that the polymer system contains carbon. By definition therefore, the organic polymer may not comprise purely polymeric or oligomeric inorganic silicate structures, e.g. sodium or potassium silicate. Further coatings wherein the binder is solely an alkali silicate is water leachable and would not provide a hardwearing/weather (water/corrosion) resistant film suitable for protecting against hydrocarbon fires.

The organic thermosetting polymer may however contain heteroatoms, and may for example, contain alkoxysilyl-functional groups. Since the organic thermosetting polymer contains carbon, an additional charring agent is not an essential component in the coating composition.

The organic thermosetting polymer maybe one or a mixture of more than one different organic thermosetting polymers.

The organic thermosetting polymer may comprise one or more of the following functional groups: epoxy, amine, ester, vinyl, vinyl ester, amide, urethane, mercaptan, carboxylic acid, acryloyl, methacryloyl, isocyanate, alkoxysilyl, anhydride, hydroxyl, alkoxy and polythiol groups.

An organic polymer suitable for use in this composition may be an: epoxy-functional resin. Typically, the epoxy resin has a number average molecular weight Mn in the range of from 300 to about 6,000, preferably 300-3,000.

Suitable epoxy-functional resins include (i) polyglycidyl ethers derived from such polyhydric alcohols as ethyleneglycol, diethyleneglycol, triethyleneglycol, 1,2-propyleneglycol, 1,4-butyleneglycol, 1,5-pentanediol, 1,2,6-hexanetriol, glycerol, thrimethylolpropane, bisphenol-A (a condensation product of acetone and phenol), bisphenol-F (a condensation product of phenol and formaldehyde), hydrogenated bisphenol-A, or hydrogenated bisphenol-F, (ii) polyglycidyl ethers of polycarboxylic acids, formed by the reaction of an epoxy compound such as epichlorohydrin with an aliphatic or aromatic polycarboxylic acid such as oxalic acid, succinic acid, glutaric acid, terephthalic acid, 2,6-napthalene dicarboxylic acid, or dimerised linoleic acid, (iii) epoxidised olefinically unsaturated alicyclic materials such as epoxy alicyclic ethers and esters, (iv) epoxy resins containing oxyalkylene groups, (v) epoxy novolac resins, which are prepared by reacting an epihalohydrin (e.g. epichlorohydrin) with the condensation product of an aldehyde with a monohydric or polyhydric phenol (e.g. phenol-formaldehyde condensate), and (vi) mixtures thereof.

The epoxy-functional resin preferably has an epoxy equivalent weight in the range of 100 to 5,000, more preferably 160-1,000 g/eq.

Commercially obtainable epoxy resins include for example DER 331™ (Dow Chemicals) and Epikote 828™ (Momentive Performance Chemicals).

Other suitable resins include vinyl ester resins for example, (meth)acrylate resins, vinyl-functional resins, for example vinyl-functional polysiloxanes and unsaturated polyesters, polyurethanes, alkyds, and alkoxysilyl-functional organic resins, or combinations thereof.

The intumescent coating compositions of the present invention based on organic thermosetting polymers, not only produce strong chars with excellent thermal protection, the coatings themselves may also have a good film strength, weather and corrosion resistance. Further, it is possible to formulate the coating compositions of the present invention with thermosetting polymers having a low volatile organic content (VOC), for example less than 250 g/L, preferably less than 100 g/L, and most preferably less than 50 g/L. The volatile organic content (VOC) may be determined in accordance with the method of ISO11890-2. If the coating composition is supplied in the form of a 2-pack composition, the VOC values refer to the volatile content of both packs when mixed in the correct ratio. In contrast, thermoplastic polymers are generally formulated with comparatively more solvent, since the evaporation of the solvent is required to affect hardening of the coating film. Having a lower VOC is not only advantageous because of the lower environmental impact, but it is also understood by the inventors to improve mechanical properties and reduce the flammability of the coating film. Not wishing to be bound by theory, the inventors surmise that this is because the use of less solvent reduces the likelihood of solvent becoming trapped in the coating film as the film hardens. Trapped organic solvent in the coating can negatively affect the mechanical properties of the coating film and also increase it's flammability. In addition, a low VOC allows application of the coating composition at high thicknesses without the solvent retention issues of a solvent based paint.

The intumescent coating composition also comprises a curing agent for curing the organic thermosetting polymer. The choice of curing agent is not particularly limited, except that it must comprise functional groups that are capable of reacting with the functional groups of the organic thermosetting polymer in order to affect cross-linking/curing. Determination of a suitable curing agent is within the general skill set and knowledge of a skilled person who formulates coating compositions.

If the coating composition is an ambient temperature curable coating composition (ambient temperature=−5-50° C.), then the curing agent comprises functional groups capable of reacting with the functional groups of the organic thermosetting polymer at ambient temperature.

For example, if the organic thermosetting polymer is an epoxy resin, suitable curing agent would comprise the following functional groups: amines (e.g. primary amine, secondary amine, and tertiary amine/imidazole type curing agents), thiols, carboxylic acids, anhydrides and alcohols such a phenols. Suitable examples are phenol resin curing agents, polyamine curing agents, polythiol curing agents, polyanhydride curing agents, and polycarboxylic acid curing agents.

Examples of phenol resin curing agents are phenol novolac resin, bisphenol novolac resin, and poly p-vinylphenol.

Examples of polyamine curing agents are diethylene triamine, triethylene tetramine, tetraethylene pentamine, dicyandiamide, polyamido-amine, polyamide resin, ketimine compounds, isophorone diamine, m-xylene diamine, m-phenylene diamine, 1,3-bis(aminomethyl)cyclohexane, bis(4-aminocyclohexyl) methane, N-aminoethyl piperazine, 4,4'-diaminodiphenyl methane, 4,4'-diamino-3, 3'-diethyl-diphenyl methane, and diaminodiphenyl sulfone, phenalkamine, mannich bases. Commercial grade quality curing agents of any of these polyamines may be used. Adducts of any of these amines can also be used. Such adducts can be prepared by reaction of the amine with a suitably reactive compound such as an epoxy resin. This will reduce the free amine content of the curing agent, making it more suitable for use under conditions of low temperature and/or high humidity.

Examples of polycarboxylic acid curing agents include phthalic anhydride, tetrahydrophthalic anhydride, methyltetrahydrophthalic anhydride, 3,6-endomethylenetetrahydrophthalic anhydride, hexachloroendomethylenetetra-hydrophthalic anhydride, and methyl-3,6-endomethylenetetrahydrophthalic anhydride.

In one embodiment, (a) comprises an epoxy resin, and an amine-functional curing agent. Advantageously, this embodiment is capable of being cured in ambient conditions (e.g. from −5 to 50° C. at 50% relative humidity "RH")

If the coating composition comprises a curing agent, it is usually used in an amount so that the stoichiometry of reactive groups on the curing agent to reactive group on the organic thermosetting resin is 0.4 to 1.5:1, preferably 0.5-1.3:1. For example, if the organic thermosetting polymer is an epoxy resin, and the curing agent is amine-functional, the stoichiometry of active hydrogen on the amine-functional curing agent to epoxy on the epoxy resin is 0.4 to 1.5:1, preferably 0.6-1.2:1.

The coating composition according to all embodiments of the present invention comprises from 35.0 to 65.0 vol %, preferably from 50.0 to 65.0 vol % of the organic thermosetting polymer and curing agent for the organic thermosetting polymer.

Source of Phosphoric or Sulphonic Acid (b)

The source of phosphoric or sulphonic acid is one or more components(s) that are capable of producing phosphoric or sulphonic acid upon exposure to heat. Examples of such sources include sodium, potassium or ammonium phosphate or sulphate salts e.g. ammonium polyphosphate (APP) monoammonium phosphate, diammonium phosphate, potassium phosphate (such as potassium tripolyphosphate), sodium phosphate, para-toluene sulphonic acid, ammonium sulphate, potassium sulphate and sodium sulphate. Preferred sources include ammonium polyphosphate (APP) and para-toluene sulphonic acid By exposure to heat, typically this means exposure to temperatures of around 150° C. and higher, usually in the event of a fire.

Suitably, the coating composition comprises a source of phosphoric acid. A preferred source of acid is ammonium polyphosphate, which is commercially obtainable as Exolit AP422™ from Clariant.

When a coating produced from the coating composition of the present invention is exposed to heat, typically in a fire, phosphoric or sulphonic acid is produced from the acid source. The acid generated from the acid source reacts with the polymer. This reaction imparts charring and blowing functions to the intumescent coating.

The coating composition comprises from 0.2 to 70.0 vol % of the source of sulphonic or phosphoric acid. Preferably, the volume of the source of sulphonic or phosphoric acid ranges from 5.0 to 70 vol %, from 10.0 to 50.0 vol % or from 10.0 to 25.0 vol %.

For the avoidance of doubt, the volume % of the source of sulphonic or phosphoric acid is the volume of the entire source of acid (i.e. volume of ammonium polyphosphate), and not the volume of the acid which is produced by the source (i.e. not the volume of the phosphoric acid).

Source of Boric Acid (c)

The coating composition of the invention comprises 0.2-60.0 volume % of a source of boric acid. Preferably the coating composition comprises 6-50.0 volume % of the source of boric acid and more preferably 10.0-25.0 volume % of the source of boric acid.

The source of boric acid may be, for example, selected from one or more of the following: boric acid, borate salts such as ammonium pentaborate, zinc borate, sodium borate, lithium borate, aluminium borate, magnesium borate and borosilicates.

Preferred sources of boric acid are ammonium pentaborate and boric acid.

0-2.0 Volume % of Melamine or Melamine Derivatives (d)

The coating composition may comprise melamine or melamine derivatives, but only up to a maximum amount of 2.0 vol %. Preferably the coating composition comprises no melamine or melamine derivatives.

Melamine has the following chemical structure:

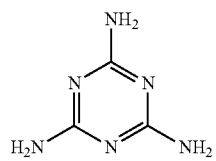

Melamine derivatives are well known in the art. Melamine derivatives may, for example, be a salt of melamine (e.g. melamine cyanurate) or comprise the same structure as shown above except at least one of the hydrogens on the amino groups attached to the aromatic ring is substituted with an optionally substituted alkyl, alkenyl or aryl group. Melamine derivatives include for example melamine formaldehyde, methylolated melamine, hexamethoxymethylmelamine, melamine monophosphate, di-melamine phosphate melamine biphosphate, melamine polyphosphate, melamine pyrophosphate, dimelamine phosphate, and melamine cyanurate, hexamethoxymethyl melamine, melam (1,3,5-triazine-2,4,6-triamine-n-(4,6-diamino-1,3,5-triazine-2-yl), melem (-2,5,8-triamino 1,3,4,6, 7,9,9b-Heptaazaphenalene) and melon (poly[8-amino-1,3,4, 6,7,9,9b-Heptaazaphenalene-2,5-diyl)imino.

In some embodiments, the coating composition comprises a low amount or no further amine-functional blowing agents. An amine-functional blowing agent, is a compound comprising amine functionality ($NHR_2$, wherein R=alkyl or H) which is capable of imparting a blowing function to the cured coating when the cured coating is exposed to heat (usually around 250° C., typically when the cured coating is exposed to a fire).

For example, the intumescent coating composition may comprise a total of 0-2.0 volume % of said melamine or melamine derivatives (d) and other amine functional blowing agents selected from dicyandiamide (NC—NH—C(NH)$NH_2$), urea (CO($NH_2$)$_2$) and derivatives thereof (f).

Examples of urea derivatives include, for example, N-alkylureas such as methyl urea, N,N'-dialkylureas such as dimethylurea, and N,N,N'-trialkylureas such as timethylurea, guanylurea, guanylurea phosphate, formamide amineo urea, guanylurea phosphate, 1,3-diamino urea, biurea and the like.

The present inventors therefore seek to reduce or preferably eliminate the need for an amine-functional blowing agents such as those selected from urea, dicyandiamide, melamine and derivatives thereof in the coating composition.

Preferably the coating composition contains no (i.e. 0 Vol %) or substantially no amine-functional blowing agents selected from urea, dicyandiamine, melamine and derivatives thereof.

The intumescent coating composition may comprise a total of 0-2.0 vol % of (d) and other amine-functional blowing agents.

Examples of other amine-functional blowing agents are, glycine, or amine phosphate, e.g. ammonium polyphosphate, azodicarbonamide, 4,4 oxybis (benzene sulfonyl hydrazide), p-toluene hydrazide, p-toluene sulfonylsemicarbazide, dinitrosopentamethylenetetramine, 5-phenyltetrazole, diazoaminobenzene. The foregoing materials release nitrogen gas when they decompose upon exposure to heat.

The intumescent coating composition may comprise a total of 0-2.0 volume % of (d), (f) and other blowing agents (g) wherein said other blowing agents (g) are selected from expandable graphite, sulfamic acid and tungstanate salts such as sodium tungstanate, and derivatives thereof.

Unexpectedly, the char formed from the coating composition of the present invention is unexpectedly stronger and harder than traditional intumescent coating compositions which comprise a much larger amount of melamine or melamine derivatives (or other blowing agents, in particular amine-functional blowing agents). The coatings of the present invention provide particularly excellent thermal protection to the coated substrate. The coatings do not crack when in a hydrocarbon fire, and surprisingly can be used without a reinforcing mesh, unlike traditional intumescent coatings which are currently available on the market which would delaminate from the substrate if used without a mesh. The reasoning behind this phenomenon is not understood. There appears to be some kind of special strengthening interaction between the source of boric acid (c) and the source of phosphoric or sulphonic acid (b) providing extra strength to the structure of the coating, but this strengthening interaction is disrupted if melamine or melamine derivatives are present.

Isocyanurate Derivatives (e)

The coating composition may comprise one or more isocyanurates derivatives, but only up to a maximum amount of 1.0 volume %. Isocyanurates derivatives are known in the art, and are known to have a blowing function. Isocyanurates derivatives comprise at least one isocyanurate ion having the following structure:

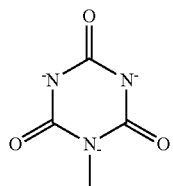

The nitrogen anions of the isocyanurate ion are neutralised by being covalently bonded, typically to, cationic residues of alkyls and alkenyls which may be optionally substituted with heteroatoms such as O, N and S, and/or hydroxyl, epoxy, halide (Cl, Br, I) and/or an isocyanate groups. Isocyanurate derivatives may therefore comprise the structure shown below.

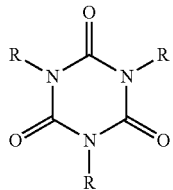

R may therefore be the same or different and be selected from a linear, branched or cyclic alkyl or alkenyl groups optionally substituted with heteroatoms such as 0, N and S, and hydroxyl, epoxy, halide (Cl, Br, I) and/or an isocyanate groups. Typically each R comprises between 1 and 20 carbons, more often, between 1 and 5 carbons.

An example is THEIC which is tris-(2-Hydroxyethyl) isocyanurate, as shown below.

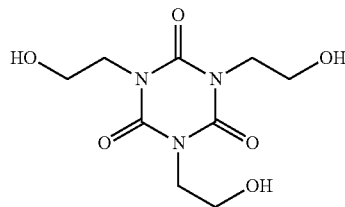

Preferably the coating composition comprises no isocyanurate derivatives.

Optional: Source of Metal Ions and/or Metalloid Ions

The intumescent coating composition may comprise one or more sources of metal ions and/or metalloid ions comprises. For example, the intumescent coating composition may comprise 1-60 vol % of one or more source(s) of metal and/or metalloid ions. Preferably, the volume of the source of metal/metalloid ions ranges from 1 to 50 vol %, from 1 to 40 vol %, from 1 to 30 vol %, from 5-60 vol %, from 5-50 vol %, from 5-40 vol %, from 5-30 vol %, from 5 to 20 vol % and/or from 5 to 12 vol %.

Optionally, the source of metal ions may be selected from one or more of the following: metal oxides, metalloid oxides, metal hydroxides, metalloid hydroxides, metal carbonates, metal bicarbonates, metal phosphates, metal chlorides, metal sulphates, metal nitrates, metal borates and complexes thereof.

Preferably the source of metal ions comprises one or more of: Al, Ti, Al, Zn, Cu, Zr Mg, Na or Ca. Preferably the source of metalloid ions comprises one or more of Si or B.

Metal oxides and metalloid oxides are compounds in which metal/metalloid atoms are bonded to oxygen. Simple metal oxides have only one type of metal ion, which bonds to an oxide ion ($O^{2-}$) in proportion to balance the charges on the metal ion. Simple metalloid oxides have only one type of metalloid ion, which bonds to an oxide ion ($O^{2-}$) in proportion to balance the charges on the metalloid ion. For example, the copper ion $Cu^+$, the magnesium ion $Mg^{2+}$, the aluminium ion $Al^{3+}$ and the silicon ion $Si^{4+}$ combine with the Oxide ion $O^{2-}$ ion to form $Cu_2O$ (Cuprite), MgO (Periclase), $Al_2O_3$ (Corundum) and $SiO_2$ (Silica). Mixed metal oxides comprise more than one type of metal ion, examples being $MgAl_2O_4$ (Spinel) and $FeTiO_3$ (Ilmenite).

Suitable sources of metal oxides, which can be used alone or in combination in the compositions of the present invention are: $Al_2O_3$, $TiO_2$, ZnO, $ZrO_2$, $SiO_2$, MgO, aluminium silicate (sometimes referred to as Kaolin), and china clay, A suitable source of metalloid oxide includes silica ($SiO_2$).

If $TiO_2$ is the only source of metal ion in the intumescent coating composition, it may be present in an amount of greater than 8.0 Vol %.

Metal hydroxides comprise metal-hydroxy bonds and metalloid hydroxides comprise metalloid-hydroxy bonds. Metal and metalloid hydroxides sometimes also comprise metal/metalloid-oxygen bonds.

Simple metal/metalloid hydroxides contain one type of metal or metalloid ion which is bonded to a hydroxide ion ($OH^-$) and optionally also an oxide ion ($O^{2-}$), in proportion to balance the changes on the metal/metalloid ion. Mixed metal/metalloid hydroxides contain more than one type of metal and/or metalloid ion, the metal/metalloid ions being bonded to a hydroxide ions ($OH^-$) and optionally also an oxide ions ($O^{2-}$), in proportion to balance the changes on the metal ions.

A particularly suitable metal hydroxide for use in the present invention is $Al(OH)_3$. Metal carbonates, metal bicarbonates, metal phosphates, metal chlorides, metal sulphates, metal nitrates and metal borates are compounds in which metal atoms are bonded to carbonate, bicarbonate, chloride, sulphate, nitrate and borate ions respectively. In these compounds, the metal ions are bonded to the above-listed functional ions in proportion to balance the charges on the metal ion. They may contain one or more different types of metal ions. These compounds are known to the person skilled in the art. For example, sources of metal phosphates include $AlPO_4$, and $MgPO_4$.

A source of metal/metalloid atoms may also be a complex comprising metal/metalloid ions bonded more than one of the following counter ions: oxide, hydroxide, carbonate, bicarbonate, chloride, sulphate, nitrate and borate ions.

Preferred sources of metals ions, for use in the present invention includes one or more of $TiO_2$, ZnO, $ZnPO_4$, $Al(OH)_3$, $Al_2O_3$, $AlPO_4$, Kaolin (alumino silicate), MgO, $MgPO_4$, $ZrO_2$.

For the avoidance of doubt, the volume % of the source of metal/metalloid ions is the volume of the entire source of metal/metalloid ions (i.e. volume of $TiO_2$), and not the volume of the metal ion(s) derived from the source (i.e. not the volume of Ti).

Optional: Carbonific Agents

The organic thermosetting polymer when in a cured coating and exposed to heat (fire) acts as a carbonific by reacting with acid to form a carbonaceous char. Further carbonific agents are therefore not essential, but may be included in the intumescent coating composition if desired. Examples of suitable additional carbon sources are pentaerythritol, dipentaerythritol, polyvinyl alcohol, starch, cellulose powder, hydrocarbon resins, chloroparaffins, and phosphated plasticisers.

Optional: Accelerators

The intumescent coating composition may also comprise accelerators known to speed up the curing reaction between an epoxy resin and the curing agent.

Examples of accelerators known to speed up the curing reaction between an epoxy resin and the curing agent include the following alcohols, phenols, carboxylic acids, sulphonic acids, and salts:

Alcohols: Ethanol, 1-propanol, 2-propanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other hydroxy tertiary amines.

Phenols: Phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrophenol, 2,4,6-Tri-(dimethylaminomethyl)-phenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenyl, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polyhydric phenols.

Carboxylic acids: acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Methanesulphonic acid and other alkyl sulphonic acid, p-toluenesulphonic acid, 4-dodecylbenzenesulphonic acid, and other aromatic sulphonic acids, naphthalene disulphonic acid, di-nonyl naphthalene disulphonic acid and other polyhydric sulphonic acids.

Other Optional Ingredients

The intumescent coating composition of the invention may also contain other components, for example one or more solvents, diluents, additives to modify the melt viscosity (such as hydrogenated castor oil), colouring agents (such as carbon black), fibres (e.g. ceramic fibre, glass fibre, carbon fibre, silica fibre filler), glass microspheres, hollow glass microspheres, rheology modifiers, plasticisers, pigment dispersants, stabilisers, mould releasing agents, surface modifiers, flame retardants, antibacterial agents, antimoulds, low density fillers, endothermic fillers, char promoters, fluxing aids, and levelling agents.

Although fibres may be present in the composition, their presence is not required to obtain a hard char.

If fibres are in the coating composition, it is preferred that they fulfil certain criteria with respect to dimensions. Fibres, if used, are preferably rod-shaped, in the sense that they have one longer "length" dimension and two "width" dimensions which are perpendicular to the length. The fibres typically have a ratio between the average length and the average width of at least 5, at least 10, for example at least 50.

Fibres may be added to the coating composition during it's manufacture or mixed with the coating composition before application.

Such fibres have an average "length", of between 150 µm to 8 mm and an average "width" of 1-50 µm.

For example, the average length may be between 150 µm to 7 mm, more preferably 3-7 mm.

The term "average" when used in connection with length and width indicates that a certain variation of the length of fibres exists within the distribution of the fibres used. Average should be understood as the mean number-average. The fibre length and width may be measured by optical image analysis using the MorFi System (MorFi Analyzer).

For example inorganic fibres may be used in the coating composition. Examples of inorganic fibres include carbide fibres, such as silicon carbide fibres, boron carbide fibres, niobium carbide fibres; nitride fibres, such as silicon nitride fibres; boron containing fibres, such as boron fibres, boride fibres; silicon-containing fibres, such as silicon fibres, alumina-boron-silica fibres, E-glass (non-alkaline alumoborosilicate) fibres, C-glass (non-alkaline or low-alkaline soda lime-alumoborosilicate) fibres, A-glass (alkaline soda lime-silicate) fibres, S-glass fibres, CEMFIL-glass fibres, ARG-glass fibres, mineral-glass fibres, non-alkaline magnesia alumosilicate fibres, quartz fibres, silicic acid fibres, silica fibres, high-silica fibres, alumina high-silica fibres, alumosilicate fibres, aluminium silicate fibres, magnesia alumosilicate fibres, soda borosilicate fibres, soda silicate fibres, polycarbosilane fibres, polytitanocarbosilane fibres, polysilazane fibres, hydridopolysilazane fibres, tobermorite fibres, samarium silicate fibres, wollastonite fibres, potassium aluminium silicate fibres; metal fibres, such as iron fibres, aluminium fibres, steel fibres, iron fibres, zinc fibres; carbon fibres, such as pure carbon fibres, graphite fibres, slagwool fibres, charcoal fibres; rockwool fibres, such as pure rockwool fibres and basalt rockwool fibres; processed mineral fibres from mineral wool; volcanic rock fibres; attapulgite fibres; etc.; modified by any chemical or physical processes; and any mixture thereof.

Preferred fibres are glass fibres, for example, E-glass fibres, C-glass fibres, A-glass fibres, S-glass fibres, CEMFIL-glass fibres, ARG-glass fibres, and mineral-glass fibres, which may optionally be coated or modified by any known process.

Fibres, for example glass fibres, may be present in the coating composition up to 10 vol %, or up to 7 vol %, for example 1-7 vol % or 1-5 vol %. As mentioned above, the average length of the fibre may be between 150 µm to 7 mm, for example 3 mm to 7 mm.

Blends of fibres may be used.

Alternatively, the composition according to the present invention substantially does not contain fibres. For example, the coating composition of the present invention may comprise up to a maximum of 1.5 weight % of fibres to the total weight of all the components in the coating composition excluding solvent.

Examples of diluents include (meth)acrylate resins and (meth)acrylate-functional resins such as urethane acrylates, acrylate esters derived from an epoxy resin, polyether acrylates, polyester acrylates, polyamide acrylate, acrylic polymers having pendant acrylic groups, and silicone acrylates.

Application

The coating composition of the present invention can be applied directly to surface to be protected (i.e. as a primer/finish) or over a primer coating layer. The coating composition of the present invention is a liquid at ambient temperature (e.g. −5 to 50° C.). It may therefore be applied by conventional methods, for example by airless spray, by pouring (used in molds), brushing or troweling.

Typically, the viscosity of the liquid coating composition is suitable to allow effective atomisation and droplet formation under the high shear conditions associated with plural component airless spray application techniques between −10 and 60° C. The liquid coating composition may be preheated up to temperatures of 60° C. in the airless spray equipment to reduce the viscosity of the liquid coating.

The intumescent coating composition is typically supplied in two or more packs, in which case the curing agent is supplied in a different package to the organic thermosetting polymer. For example, the coating composition may comprise a first pack comprising the thermosetting polymer(s) and a second pack comprising the curing agent(s) for the thermosetting polymer(s). The first pack and the second pack are mixed together prior to application on the substrate.

The coating composition may be applied on various substrates. It is particularly suitable to be applied on metal substrates, for example steel and aluminium substrates, and composite materials, for example glass reinforced plastic (GRP) Due to the combination of excellent strength and thermal protection afforded by the char, the intumescent coating may protect structures from hydrocarbon fires, such as jet fires. The coating composition of the invention therefore may be applied in zones where there is a jet-fire risk (such as such as offshore installations, oil and gas installations).

When applied to a substrate, the dry film thickness of the layer of intumescent coating is typically between 0.1 mm and 40 mm, for example 1.0 mm and 30 mm, or 2.0 mm and 30 mm. The dry film thickness may be measured using an Elcometer 355 Coating Thickness Gauge.

For the avoidance of doubt, the features provided in the above description can be combined in any order.

The invention will now be elucidated with reference to the following examples. These are intended to illustrate the invention but are not to be construed as limiting in any manner the scope thereof.

EXAMPLES

Sample Preparation of Compositions 1-3 and Test Procedure

Compositions 1, 2 and 3 comprising the components shown in Table 1 were made by first mixing all components except for the curing agent into the resin base by high speed dispermat. The polyamido amine curing agent was then added.

TABLE 1

| Component (Vol %) | Sample Coating Composition # | | |
|---|---|---|---|
| | 1 | 2* | 3* |
| Epoxy Resin, D.E.R.331 (DOW) (epoxy resin) | 42.3 | 41.1 | 41.1 |
| Polyamido amine Curing Agent having an amine equivalent weight of 93 g/mol | 22.7 | 22.0 | 22.0 |
| Boric Acid | 25.6 | 24.8 | 24.8 |
| Ammonium Polyphosphate | 6.4 | 6.2 | 6.2 |
| Glass Fibre | 3.0 | 2.9 | 2.9 |
| THEIC | 0 | 0 | 3.0 |
| Melamine | 0 | 3.0 | 0 |

*Comparative Examples

Each test coating composition was then applied to 150 mm×100 mm×10 mm primed panels to a dry film thickness of 5 mm on both panel sides and panel edges. The samples were placed in a muffle furnace at a temperature of 1100° C. After 20 minutes the paints had fully intumesced to form a solid char. The integrity and expansion of each sample was assessed at this point.

Test Results

Sample 1) with no added melamine or THEIC formed an expanded, intumesced char with no visible cracking through to the metal substrate on the edges or sides.

Sample 2) containing melamine showed early cracking and splitting along the edges of the panel. These splits were made worse as intumescence proceeded eventually causing char detachment.

Sample 3) containing THEIC showed a number of cracks, extending down to the metal substrate. The expanded char remained on the substrate, but the cracks provided a clear route for breaching the thermal barrier of the char.

The invention claimed is:

1. A liquid intumescent coating composition comprising:
   (a) 25.0-75.0 volume % of one or more organic thermosetting polymer(s) and one or more curing agent(s) for the organic thermosetting polymer(s),
   (b) 1.0-70.0 volume % of a source of phosphoric or sulphonic acid selected from one or more of sodium, potassium or ammonium phosphate or sulphate salts, and para-toluene sulphonic acid,
   (c) 6.0-60.0 volume % of a source of boric acid selected from one or more of boric acid, borate salts, and borosilicates,
   (d) 0-2.0 volume % of melamine or melamine derivatives, and
   (e) 0-1.0 volume % of one or more isocyanurate derivatives,
   wherein the organic thermosetting polymers do not comprise a polysiloxane, and wherein volume % is calculated on the total volume of the non-volatile components in the coating composition.

2. The intumescent coating composition of claim 1, wherein the borate salts are selected from one or more of the following: ammonium pentaborate, zinc borate, sodium borate, lithium borate, aluminium borate and magnesium borate.

3. The intumescent coating composition of claim 1 comprising 35.0-65.0 volume % of (a).

4. The intumescent coating composition of claim 1 comprising 1.0-50.0 volume % of (b).

5. The intumescent coating composition of claim 1 comprising 6.0-50.0 volume % of (c).

6. The intumescent coating composition of claim 1 comprising a total of 0-2.0 volume % of said melamine or melamine derivatives (d) and amine functional blowing agents selected from dicyandiamide, urea and derivatives thereof (f).

7. The intumescent coating composition of claim 6 comprising a total of 0-2.0 volume % of said melamine or melamine derivatives (d), said amine functional blowing agents selected from dicyandiamide, urea and derivatives thereof (f), and other blowing agents (g) wherein said other blowing agents (g) are selected from expandable graphite, sulfamic acid and tungstanate salts, and derivatives thereof.

8. The intumescent coating composition of claim 1 comprising glass fibres.

9. The intumescent coating composition of claim 6 comprising 0 volume % of (d) and/or 0 volume % of (e).

10. The intumescent coating composition of claim 1, wherein the organic thermosetting polymer of (a) comprises at least one of the following functional groups: epoxy, amine, ester, vinyl, vinyl ester, amide, urethane, mercaptan, carboxylic acid, acryloyl, methacryloyl, isocyanate, alkoxysilyl, anhydride, hydroxyl, alkoxy or polythiol groups.

11. The intumescent coating composition of claim 1, wherein the organic thermosetting polymer of (a) is an epoxy resin and the curing agent of (a) is selected from an amine, thiol, carboxylic acid, anhydride or alcohol functional curing agent.

12. A coated substrate, wherein the substrate is coated with the intumescent coating composition of claim 1.

13. The coated substrate according to claim 12, wherein the coated substrate does not comprise a reinforcing mesh.

14. A method of protecting a structure from fire, the method comprising coating the structure with the intumescent coating composition of claim 1, and allowing the coating composition to cure.

15. The method of claim 14, wherein the coating is done without a reinforcing mesh, and the curing is done at ambient temperature.

16. The intumescent coating composition of claim 1 comprising 50.0-65.0 volume % of (a).

17. The intumescent coating composition of claim 1 comprising 5.0-25.0 volume % of (b).

18. The intumescent coating composition of claim 1 comprising 10.0-25.0 volume % of (c).

19. The intumescent coating composition of claim 7 comprising 0 volume % of (d) and/or 0 volume % of (e).

* * * * *